Nov. 19, 1940.  S. O. WHITE  2,221,893
TRANSMISSION SYNCHRONIZER
Filed Aug. 25, 1937  3 Sheets-Sheet 1

Inventor:
Samuel O. White
By: Edward C. Gritzbaugh
Atty.

Inventor:
Samuel O. White
By Edward C. Fitzhugh
Atty.

Patented Nov. 19, 1940

2,221,893

UNITED STATES PATENT OFFICE 2,221,893

TRANSMISSION SYNCHRONIZER

Samuel O. White, Muncie, Ind., assignor to Borg-Warner Corporation, Chicago, Ill., a corporation of Illinois Application August 25, 1937, Serial No. 160,844

31 Claims. (Cl. 192—53)

This invention relates to improvements in transmission synchronizers such as employed in the change-speed transmissions of motor vehicles to bring driving and driven power transmitting elements to the same speed before drivingly interlocking the elements through positive clutch means. The invention is particularly directed to transmission synchronizers of the so-called "blocker" type having means to prevent engagement of the positive drive clutch prior to the time that synchronization takes place.

An object of my invention is to provide an improved transmission synchronizer, of the blocker type, which requires a minimum of manual effort to effect blocking of the shiftable positive drive clutch member and to initiate operation of the synchronizing clutch.

Another object is to provide an improved transmission synchronizer as described, which has but relatively few parts and which may be installed in a change gear transmission in the same space heretofore occupied by a transmission synchronizer not of the blocker type.

A further object is to provide an improved transmission synchronizer as described, which requires but a minimum manual force to effect driving interengagement between the driving and driven element of the transmission once synchronization has been brought about.

Other objects, the advantages and uses of the invention, will become apparent after reading the following specification and claims, and after consideration of the drawings forming a part of this specification, wherein

I have selected for illustration herein, embodiments of my invention as applied to certain of the torque transmitting members of a conventional change-speed transmission of the type used in motor vehicles and such as illustrated in my prior U. S. Patent No. 1,872,566.

Figure 1:
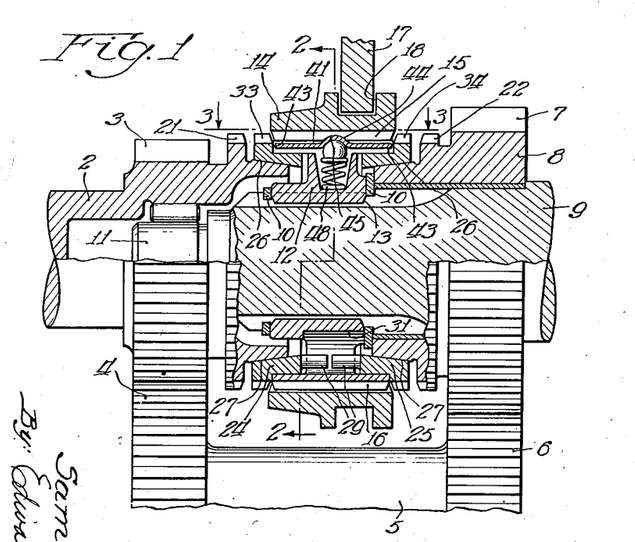
Fig. 1 is a fragmentary elevation partially in section of a change-speed transmission mechanism incorporating my improved synchronizer.
Figure 2:
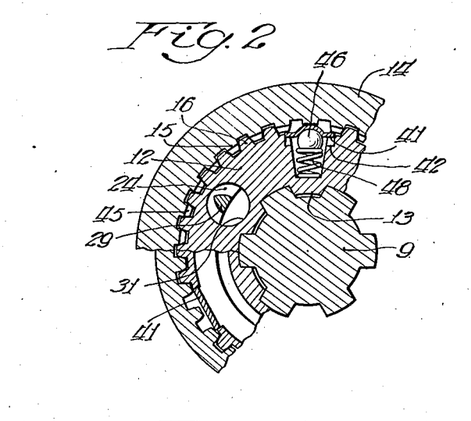
Fig. 2 is a sectional view along the line 2—2 of Fig. 1.
Figure 3:
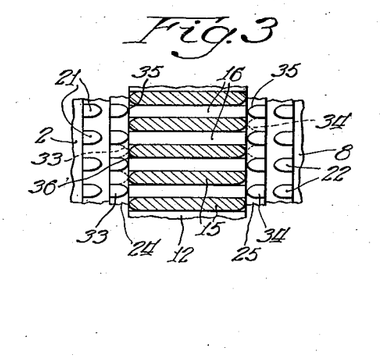
Fig. 3 is a sectional view along the line 3—3 of Fig. 1.

With reference to Figs. 1 to 3 hereof, such transmission may include a drive shaft 2 having formed thereon an external gear 3 engageable with a gear 4 carried on the transmission countershaft 5. A second gear 6 also carried on the countershaft 5 may mesh with the external teeth 7 of the transmission second speed gear 8, the gear 8 being rotatably mounted upon the transmission driven shaft 9 but fixed against axial movement relative thereto. The shafts 2 and 9 being coaxial, one end 11 of the shaft 9 may be piloted in the adjacent end of the shaft 2, as shown.

A clutch supporting member 12 is mounted upon the shaft 9 between the gear 3 and gear 8 and is keyed thereto, as indicated at 13. The member 12 is also fixed against axial movement relative to the shaft 9 by thrust washers 10 and serves as a support for the movable element 14 of a positive jaw clutch. Except for practical difficulties of construction, the member 12 could be formed integral with the shaft 9. The movable jaw clutch element 14 may take the form of a sleeve having internal gear-like clutch teeth 15 slidably engaged with a complementary externally toothed portion 16 of the member 12 (see Fig. 2). A shift fork 17 received in an annular groove 18 formed in the outer wall of the clutch element 14 serves as a means axially to shift the member 14 selectively in the direction of the gear 3 or gear 8 as desired. Positive jaw clutch teeth conforming in contour with the teeth 16 upon the member 12 and in end to end register therewith are formed upon each of the gears 3 and 8, as illustrated at 21 and 22 respectively. Movement, therefore, of the clutch element 14 to the left, as viewed in Fig. 1, will serve positively to drivingly interconnect the drive member 2 with the shaft 9, and, in like manner, movement of the clutch element 14 to the right, will provide a direct drive connection between the gear 8 and the shaft 9. Such engagement of the positive jaw clutch may not take place, however, without clashing of the parts and injury thereto, unless the relatively fixed clutch part to which the movable clutch element 14 is drivingly engaged, is rotating at the same speed as the element 14 and is in synchronism therewith.

In order to establish synchronism between the movable jaw clutch element 14 turning with the shaft 9, and the relatively fixed parts 21 or 22, as desired, I provide a friction clutch synchronizer mechanism between the support member 12 and the gears 3 and 8. Such mechanism, in the construction illustrated, may comprise a pair of forged bronze rings 24 and 25, respectively, one located at each side of the support member 12 and each having a conical friction surface 26 engageable with a complementary friction surface 27 formed on an adjacent portion of the gear 3 and gear 8, respectively. Although the coacting friction faces may at all times be in close association with each other, as indicated in Figs. 1, 5, 7 and 9, and separated only by oil films, it is to be understood that they are in driving engagement only when axial thrust is being transmitted to them, as will be described hereinafter.

The synchronizer rings 24 and 25 may be drivingly connected to the support 12 as by means of integral lugs 29 formed on that side of each ring facing the support 12, the lugs extending into openings 31 located transversely through the member 12. The openings 31 may be of such diameter relative to the width of the lugs 29 as to permit a limited relative rotation between each ring and the member 12 an amount equal to, but not greater than, the width of the teeth formed on the movable positive clutch element 14. Except for the lugs 29 which limit relative rotation of the synchronizer ring, with respect to the member 12 and its supporting shaft 9, each of the rings is free to float between the member 12 and the adjacent friction clutch surfaces 26 of the gears 3 and 8 respectively.

The rings 24 and 25 each possess, in addition to the function of a friction clutch synchronizer element, the function of a blocker mechanism for preventing engagement of the jaws of the positive clutch 14—21 and 14—22, prior to the time that synchronism of the positive jaw clutch parts takes place. This function of the rings 24 and 25 may be carried out by the provision of radially extending external blocker teeth 33 and 34 formed on the outer peripheries of the rings 24 and 25, respectively, and conforming in contour to the clutch teeth 21 and 22 on the gears 3 and 8, respectively. The blocker teeth 33 and 34 may be further formed with those ends thereof facing the slidable clutch member 14 chamfered as indicated at 35 (see Fig. 3). The adjacent ends of the teeth 15 upon the clutch element 14 may likewise be chamfered as indicated at 36, so that movement of the jaw member 14 in the direction of the relatively fixed jaw teeth 21 or 22 may cause the registering chamfered surfaces 35 and 36 of the blocker teeth and jaw teeth 15 to contact along surfaces disposed angularly with respect to the axis of rotation of the clutch parts at such times as when the teeth 33 or 34 are not in direct end-to-end register with the teeth 16 upon the clutch support member 12. This condition of the parts may exist whenever one of the two torque-transmitting members to be interconnected, such as the shaft 9 to the gear 3, or gear 8, is rotating at a speed different from the speed of the remaining member, hence causing the synchronizer-blocker ring to be moved toward one or the other of its limits of rotation relative to the support 12. As the parts approach synchronism, there will be a relative reversal of rotation, thus causing the blocker teeth for a moment to register directly with the teeth 16 on the support 12, which position is indicated in full lines of Fig. 3, and at such moment, the clutch element 14 will be free to continue in its movement into engagement with the relatively fixed jaw clutch teeth toward which it has been initially moved. This blocking function of the synchronizer-blocker rings will, of course, take place only when the rings are urged toward their adjacent friction clutch complement so as to bring about frictional driving engagement between the synchronizer-blocker ring and the torque member with which the ring is engaged frictionally.

Means for causing the synchronizer-blocker ring to move first to block positive jaw clutch engagement and thereafter to synchronize the parts to be coupled, upon movement of the positive clutch element 14, may comprise a plurality of relatively light-weight, low inertia, substantially rigid thrust bars 41, spaced at equal distances apart from one another about the circumference of the support member 12 and disposed parallel to the axis thereof. Each thrust bar may be located in a channel 42 formed transversely across the peripheral surface of the support member 12 and each is of such length that the opposed ends thereof lie just free of the adjacent and radially extending surfaces 43 of the portions of the rings 24 and 25 upon which the blocker teeth 33 and 34, respectively, are disposed. Each of the thrust bars 41 may have formed at the mid-portion thereof, a convex spherical projection 44 adapted yieldably to be received within an annular groove 45 formed on the inner wall of the toothed clutch element 14, as by turning operation. A steel ball 46, one for each of the thrust bars 41, may be located on the concave spherical side of the projection 44 and urged radially outwardly toward the element 14 by compression springs 48, received within a frusto-conical bore formed in the member 12 so that the entire spring and ball assembly may sway laterally during endwise movement of the thrust members 41 while engaged with the moving clutch element 14.

It will readily be apparent that, with the parts aranged as described, initial movement of the positive clutch element 14 toward either of its complementary clutch portions 21 or 22 will cause the thrust bars 41 to move therewith and to bear against and to urge one of the synchronizer-blocker rings 24 or 25 toward its friction clutch complement depending upon which direction the positive clutch member 14 is urged. This initial axial movement of the synchronizer-blocker ring will cause the ring, when engaged with its friction clutch complement, to turn with the part to which it is frictionally engaged and thus cause a relative rotation between the ring and the support member 12 in the direction of the movement of the part which is rotating as a superior speed, thus to cause the chamfered surfaces 35 and 36 of the blocker teeth and the positive jaw clutch teeth 15 to move into blocking register, as indicated in dotted lines in Fig. 3. Continued movement of the positive jaw clutch element 14 will thereupon be resisted by the chamfered surfaces of the blocker teeth even though considerable force is applied to the positive clutch element 14, tending to cause it to move into engagement with its desired positive jaw clutch complement. This resistance to positive clutch engagement will exist until the part to be drivingly interlocked to the positive jaw clutch, arrives at a synchronous speed therewith at which point there will be a relative reversal of movement causing the blocker-synchronizer ring to move toward the position indicated in full lines of Fig. 3. When such position is assumed, there will be no further resistance to clutch movement of the part 14 and it may, therefore, be urged onwardly into positive clutch engagement with the teeth 21 or 22, the yielding connection between the thrust bars 41 and annular grooved portion 45 of the clutch element 14 breaking away under the force applied to move the clutch element 14.

From the foregoing it will be apparent that I have provided an improved transmission synchronizer wherein relatively slight manual effort is required through application of the gear shift fork 17 to effect, first, a blocking of the movable positive clutch jaw, and thereafter engagement of the frictional clutch elements of the synchronizer for the function of synchronizing the positively interengageable parts through the friction clutch elements of the device. This reduction in manual effort required to initiate synchronizer function is very largely attributable to the extremely low inertia of the thrust bars interposed between the synchronizer-blocker rings and the movable clutch element through the yielding break-away connection described. In the past it has been customary yieldingly to interlock the movable clutch element with a relatively heavy hub assembly having mass as great or greater than the support assembly 12 of the device described herein, the synchronizer-blocker elements being carried by such relatively heavy hub assembly. Such prior construction has therefore presented parts of relatively high inertia requiring movement through gear shift fork during initiation and operation of the blocking and synchronizer functions.

I have also provided in the invention herein described a construction wherein resistance to movement of those parts required to be moved during normal functioning of the device due to friction, has been reduced to a minimum, and in certain of the embodiments hereinafter described have used frictional engagement as the sole interconnecting means between the thrust bars and the movable clutch element, such frictional engagement possessing meritorious function rather than resistance to ease and efficiency of operation.

Figure 4:
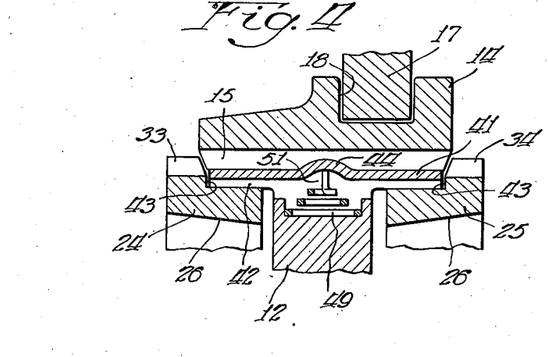
Figs. 4, 5, 7, 9, 11 and 15 are fragmentary sectional views illustrating modifications of the transmission synchronizer illustrated in Fig. 1.

In Fig. 4 I have illustrated a modification of the yielding connection between the thrust members 41 and the movable clutch element 14 comprising the substitution of the steel balls 46 and springs 48 for springs 49 of the spiral pancake type having upturned end portions 51 bearing directly upon the inner and concave side of the portion 44 of the thrust members, as shown. The springs 49 readily permit endwise movement of the thrust bars and act at all times yieldably to urge the thrust bars outwardly toward the inner wall of the clutch element 14 as required for break-away engagement therewith.

Figures 5, 6:
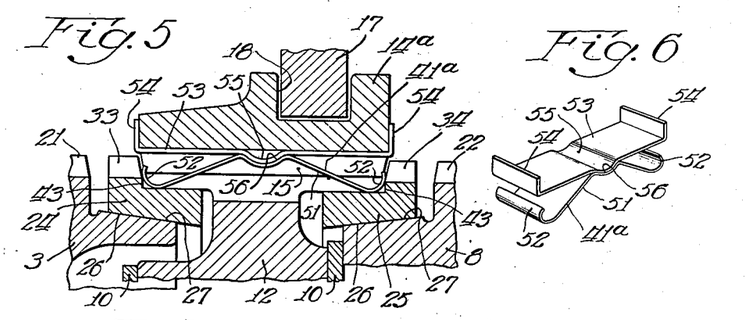
Figs. 6, 8, 10 and 12 are perspective views of portions of the mechanism illustrated respectively in Figs. 5, 7, 9 and 11.

Referring to Figs. 5 and 6, a further modification of the thrust bar assembly may comprise the use of spring steel for the thrust bars 41a which members may be formed, as shown, of strip steel with its mid-portion 51 bowed radially outwardly toward the inner wall of the clutch element 14a. The ends 52 of the bars 41a may be curled upwardly to provide contact with the adjacent surfaces 43 of the synchronizer-blocker rings 24 and 25. Between the inner wall of the clutch element 14a and the thrust bars 41a are located straps 53 having upturned ends 54 engageable with adjacent end walls of the clutch element. For this purpose one of the clutch teeth 15 is cut away for each thrust assembly to allow working space. The straps 53 and thrust bars 41a may each be formed with interengaging cylindrical projections and depressions 55 and 56 respectively, thus to establish a yieldable break-away connection between clutch element assembly and thrust bars having the function of the break-away connection described in connection with Figs. 1 to 3 inclusive, and Fig. 4.

Figure 7:
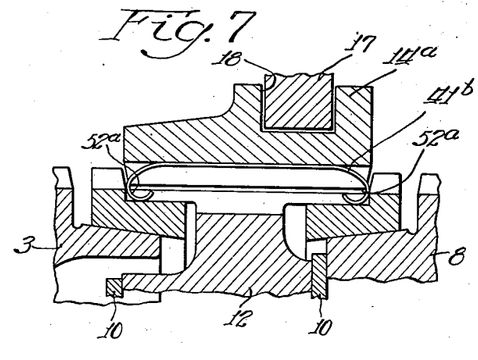
Figure 8:
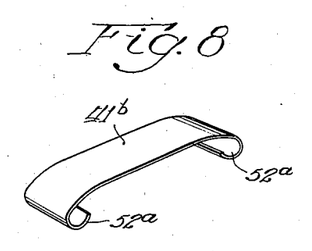

In Figs. 7 and 8 there is illustrated a simplified form of yieldable connection between clutch element 14a and thrust bars 41b wherein surface friction alone serves to cause the thrust bars 41b to follow the movement of the clutch element. The thrust bars 41b may be of spring steel curved downwardly at their ends 52a to engage the synchronizer-blocker rings and the intermediate portions thereof yieldingly held in frictional engagement with the adjacent inner surface of the clutch element from which the registering clutch tooth 15 has been removed. In this form of the thrust bars each should be sprung outwardly to provide a spring bias in the direction of the inner wall of the clutch element.

Figure 9:
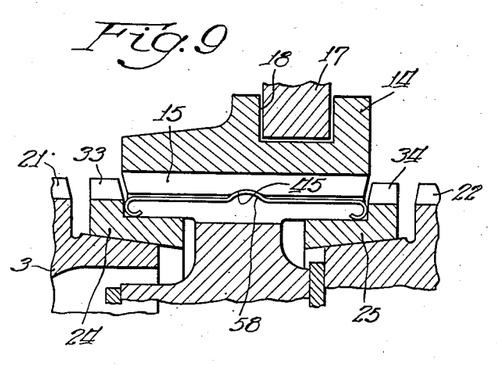
Figure 10:
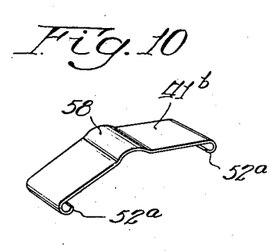
Figure 11:
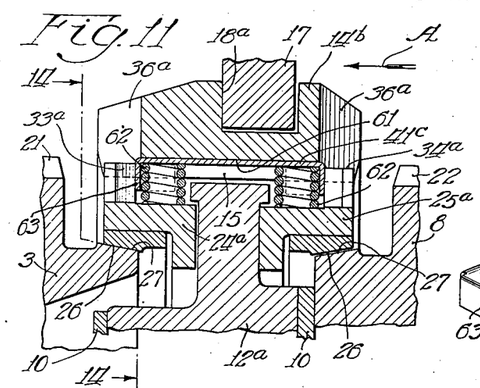
Figure 12:
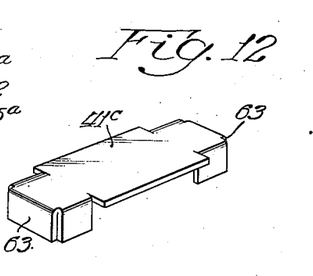
Figure 13:
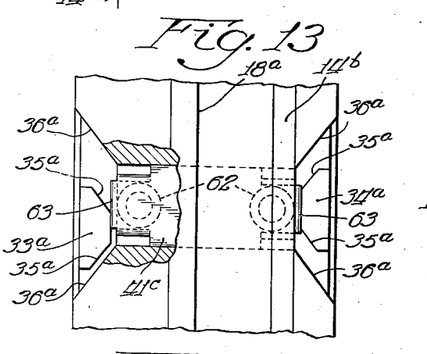
Fig. 13 is a fragmentary top plan view of the mechanism illustrated in Fig. 11.
Figure 14:
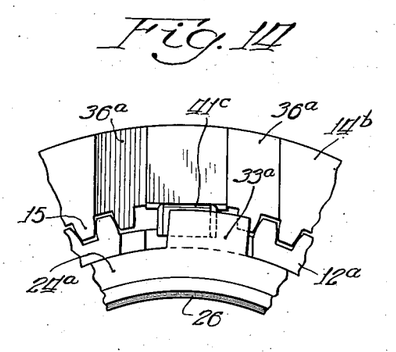
Fig. 14 is a sectional view along the line 14—14 of Fig. 11.

In Figs. 9 and 10, the structure is very similar to that shown in Figs. 7 and 8 except that the clutch element 14 is formed, as described in connection with Figs. 1 to 4 inclusive, with the annular groove 45, and the thrust bars 41b are formed at their mid-portions with cylindrical projections 58 yieldingly engageable with the grooved portion of the clutch element 14, as shown, to establish the desired breakaway connection.

Referring now to Figs. 11 to 14 inclusive, I have shown another form of the thrust bar assembly wherein each of the thrust bars 41c are urged radially outwardly into frictional engagement with an inner wall surface 61 of the clutch element 14b by a pair of compression springs 62, one at each end portion of each thrust bar, the inner ends of each spring bearing directly upon the outer peripheral wall of the synchronizer-blocker rings 24a and 25a, respectively. In this embodiment of the invention, I replace the blocker teeth 33 and 34 with radially extending lugs 33a and 34a respectively, one for each of the thrust bars 41c. Each lug may have chamfered blocking surfaces 35a engageable with cooperative and inclined blocking surfaces 36a formed on the adjacent recessed end walls of the clutch element 14b. Relative rotation between the synchronizer-blocker rings and clutch element 14b is limited by lug engagement with its adjacent blocking surface 36a. The break-away connection between clutch element and thrust bars is by way of frictional engagement only as referred to in the description of Figs. 7 and 8. The thrust bars 41c, in this embodiment, may be of relatively rigid construction, and each has downturned ends 63 providing thrust engagement with the rearward surfaces of the lugs 33a and 34a respectively.

Figure 15:
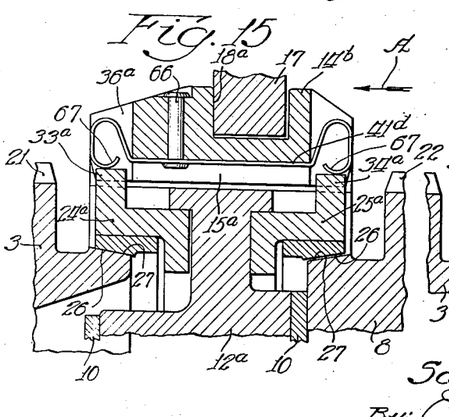
Figure 16:
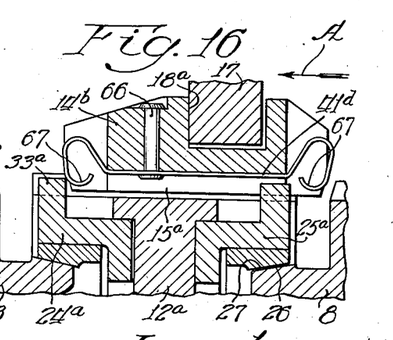
Fig. 16 is a fragmentary sectional view similar to Fig. 15 illustrating the parts in the position assumed when shifting from second speed to direct drive.

In Figs. 15 and 16, there is shown a further embodiment of the invention comprising a further modification of the transmission synchronizer wherein the synchronizer-blocker rings are of the type illustrated in Figs. 11 to 14 inclusive. The thrust bars 41d, however, differ in their relationship to the clutch element 14b and rings 24a and 25b from any of the embodiments previously described in that each is securely fixed to the clutch element 14b by such means as rivets 66 and the break-away connection between the clutch element and the rings through the thrust bars is accomplished by yielding contact between the spring steel thrust bars and the lug portions of the rings. To attain this function the outer ends of the thrust bars 41d are fashioned to provide spring fingers 67 biased radially inwardly toward the axis of the torque members 2 and 9 so that the fingers will move into the position shown in Fig. 16 in back of the synchronizer-blocker ring lugs when the clutch element 14b is moved to either limit of its clutch engaging travel.

I claim:

In Fig. 16 I have shown the parts as they appear when the clutch is in movement from second speed through neutral toward third speed position. Movement of the clutch element 14b, at this time in the direction of the arrow A, will first cause the synchronizer-blocker ring 24a to be urged into frictional driving engagement with its friction clutch complement on the gear 3. Blocking will take place because of relative rotation between the ring and the clutch element 14b on the support 12a. Continued movement of the clutch member 14b after synchronization has been effected, will cause the parts to assume the position shown in Fig. 15, and thereafter full positive jaw clutch engagement between the teeth 15 on the element 14b and the teeth 21 on the gear 3. It will be noted (Fig. 16) that during initial movement of the clutch element 14b from one speed position to another that in addition to urging one ring (24a in Fig. 16) toward its friction clutch complement, the opposite spring finger 67 will serve to break frictional engagement between the other ring and its friction clutch complement.

I claim:

1. In a transmission synchronizer, of the character described, a rotatably mounted and axially fixed torque transmitting member, an axially movable clutch element encircling said member and drivingly connected thereto, a plurality of thrust bars disposed parallel to the axis of rotation, free to slide axially relative to said torque member and adapted to rotate therewith, spring means urging said thrust bars radially outwardly of the axis of said torque member toward the inner wall of said clutch element, and means providing a break-away connection between said thrust bars and said clutch element adapted to resist disengagement in an amount determinable by the force exerted upon the thrust bars by said spring means.

2. The combination defined in claim 1, wherein said thrust bars are of rigid metal and said spring means comprises compression springs interposed between the thrust bars and said torque member, and wherein each spring is free to sway axially of the torque member as the thrust bars are moved with said clutch element.

3. A transmission synchronizer comprising, a pair of torque-transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, and means including rigid thrust bars, having in aggregate a low inertia relative to said movable jaw clutch element, each operatively interposed between said synchronizer element and said movable clutch element in a position parallel to the axis of said torque-transmitting members for transmitting thrust from said movable clutch element to said synchronizer element in the direction of said other torque-transmitting member, thus to establish a frictional driving connection between said pair of torque members, said thrust bars being disposed radially beyond the outline of said friction clutch surfaces.

4. A transmission synchronizer comprising, a pair of torque-transmitting members mounted in axial alignment, a movable jaw clutch element carried by one of said members and adapted to be moved into engagement with a jaw clutch element carried by the other member thus to establish a positive drive connection between said members, a synchronizer element adapted to have limited axial and circumferential movement relative to said one torque-transmitting member, and means including a plurality of thrust bars disposed parallel to the axis of said torque-transmitting members with their ends adapted to engage radially outwardly facing surfaces of said synchronizer element and be thereby supported, and to axially abut portions of said synchronizer element so as to transmit axial thrust thereto, and said thrust bars having intermediate regions in engagement with radially inwardly facing surfaces of said movable clutch element so as to receive axial thrust therefrom, said synchronizer element including blocking means adapted in one of its circumferentially adjusted positions to block advance of said movable clutch element to its positive clutching position, and in another of such circumferentially adjusted positions, to allow said movable clutch element to complete such advance.

5. In a transmission synchronizer, a pair of axially aligned torque-transmitting members, a movable jaw clutch element carried by one of said members and adapted to be moved into engagement with a jaw clutch element carried by the other member, thus to establish a positive drive connection between said members, a synchronizer element adapted to be moved axially into frictional driving engagement with said other member, and means including a plurality of substantially rigid low inertia thrust bars disposed parallel to the axis of said members, having axial thrust receiving engagement with interior surfaces of said movable clutch element and having their ends arranged to engage radially outwardly facing surfaces of said synchronizer element so as to be supported thereby and to axially abut portions of said synchronizer element so as to transmit axial thrust thereto for establishing said frictional driving engagement.

6. In a transmission synchronizer, a pair of axially aligned torque-transmitting members, a movable jaw clutch element carried by one of said members and adapted to be moved into engagement with a jaw clutch element carried by the other member, thus to establish a positive drive connection between said members, a synchronizer element adapted under axial pressure to establish frictional synchronizing engagement with said other member, and means including a plurality of substantially rigid low inertia thrust bars disposed parallel to the axis of said members adapted to yieldingly receive axial thrust from said movable clutch element and having their ends arranged to engage radially outwardly facing surfaces of said synchronizer element so as to be supported thereby and to axially abut portions of said synchronizer element so as to transmit axial thrust thereto.

7. In a transmission synchronizer, a pair of axially aligned torque-transmitting members, a movable jaw clutch element carried by one of said members and adapted to be moved into engagement with a jaw clutch element carried by the other member, thus to establish a positive drive connection between said members, a synchronizer element adapted to be moved axially into frictional driving engagement with said other member, and means including a plurality of substantially rigid low inertia thrust bars disposed parallel to the axis of said members adapted to yieldingly receive axial thrust from said movable clutch element and having their ends arranged to be supported by and to transmit axial thrust to said synchronizer element for establishing said frictional driving engagement.

8. In a transmission synchronizer, a pair of axially aligned torque-transmitting members, a movable jaw clutch element carried by one of said members and adapted to be moved into engagement with a jaw clutch element carried by the other member, thus to establish a positive drive connection between said members, a synchronizer element adapted under axial pressure to establish frictional synchronizing engagement with said other member, and means including a plurality of substantially rigid thrust bars disposed parallel to the axis of said members adapted to yieldingly receive axial thrust from said movable clutch element and having their ends arranged to engage radially outwardly facing surfaces of said synchronizer element so as to be supported thereby and to axially abut portions of said synchronizer element so as to transmit axial thrust thereto.

9. In a transmission synchronizer, a pair of axially aligned torque-transmitting members, one of which comprises a shaft, a hub axially fixed on said shaft, a movable jaw clutch element encircling said hub, drivingly connected therewith and adapted to be shifted axially with respect to the said hub, into engagement with a jaw clutch element carried by the other member, thus to establish a positive drive connection between said members, a blocker-synchronizer ring adapted to have limited axial and circumferential movement relative to said hub and having a friction face for frictional driving engagement with said other member, and means including a plurality of substantially rigid, low inertia thrust bars disposed radially beyond said hub with their ends in engagement with radially outwardly facing regions of said blocker-synchronizer ring and thereby supported, adapted to transmit axial thrust to said ring, and having intermediate regions in engagement with radially inwardly facing surfaces of said movable clutch element so as to receive axial thrust therefrom, said ring including blocking means adapted in one of its circumferentially adjusted positions, to block advance of said movable clutch element to its positive clutching position, and in another of such circumferentially adjusted positions, to allow said movable clutch element to complete its advance.

10. A transmission synchronizer comprising a pair of aligned rotatable torque-transmitting members, a movable jaw clutch element drivingly associated with one of said members and adapted to be moved into engagement with a jaw clutch element drivingly associated with the other member, thus to establish a positive drive connection between said members, a synchronizer element drivingly associated with said one member and adapted to be moved into frictional driving engagement with a cooperating friction clutch element drivingly associated with said other member, and means including a low inertia thrust bar operatively interposed between said synchronizer element and said movable clutch element in a position parallel to the axis of said torque transmitting members and radially beyond the outline of the friction clutch surfaces of said synchronizer and friction clutch elements, for transmitting thrust from said movable clutch element to said synchronizer element so as to establish said frictional driving engagement.

11. A transmission synchronizer as defined in claim 10, wherein the driving association between said synchronizer element and said one torque transmitting member comprises a lost motion connection and wherein said synchronizer element is provided with blocker portions adapted at one limit of said lost motion connection to block axial advance of said movable clutch element into engagement with the other jaw clutch element.

12. In a transmission synchronizer, a pair of aligned rotatable torque-transmitting members, a movable jaw clutch element drivingly associated with one of said members and axially shiftable into engagement with a jaw clutch element carried by the other member, thus to establish a positive drive connection between said members, a synchronizer element drivingly associated with said one member and axially shiftable into frictional driving engagement with a complementary friction clutch element drivingly associated with said other member, and means including a thrust bar disposed parallel to the axis of said members, having axial thrust-receiving engagement with an interior surface of said movable clutch element, and having an end arranged to engage a radially outwardly facing surface of said synchronizer element so as to be supported thereby and to axially abut a portion of said synchronizer element so as to transmit axial thrust thereto for establishing said frictional driving engagement.

13. In a transmission synchronizer, a pair of aligned rotatable torque-transmitting members, a movable jaw clutch element drivingly associated with one of said members and axially shiftable into engagement with a jaw clutch element drivingly associated with the other member, thus to establish a positive drive connection between said members, a synchronizer element having an axially extending portion and a radially outwardly projecting portion, drivingly associated with said one member and axially shiftable into frictional driving engagement with a friction clutch element drivingly associated with said other member, and means including a thrust bar disposed parallel to the axis of said members and radially beyond the outline of said friction clutch surfaces, having axial thrust-receiving engagement with an interior surface of said movable clutch element and having an end axially overlapping the axially extending portion of said synchronizer element and engageable with the radially projecting portion so as to transmit thrust thereto.

14. A transmission synchronizer as defined in claim 13, wherein the driving association between said synchronizer element and said one torque-transmitting member comprises a lost motion connection and wherein the synchronizer element includes blocker means adapted, in one position of said lost motion connection, to block axial advance of said movable clutch element into said engagement with the other jaw clutch element and, in another position of said lost motion connection, to allow said movable clutch element to complete its axial advance to positive clutching position.

15. In a synchronizing transmission, a pair of shafts to be synchronized, friction and jaw clutch elements drivingly associated with one of said shafts, a hub axially fixed on the other shaft, a synchronizer ring having a radially outwardly projecting part and a collar portion axially recessed into said hub, said ring having an oscillatable lost motion driving connection with said hub and being adapted, under axial pressure, to establish a frictional synchronizing connection between said shafts by engagement with said friction clutch element, a jaw clutch sleeve encircling and having internal teeth in splined connection with said hub and shiftable axially to mesh said teeth with said jaw clutch element, and means including an axially arranged thrust bar interposed between said hub and sleeve, in axial thrust receiving association with the interior of said sleeve and having an end axially overlapping and radially outwardly of said collar portion and engageable with said radially projecting part for transmitting thrust from said sleeve to said ring, said ring having blocker teeth and being adapted, under frictional engagement with said friction clutch element, to be biased to a position at one limit of said lost motion connection wherein said blocker teeth are interposed in the path of axial advance of the teeth of said sleeve.

16. In a synchronizing transmission, a shaft, a hub axially fixed thereon, a synchronizer ring having a radially outwardly projecting portion and a collar portion axially recessed into said hub, said ring being adapted, under axial pressure, to establish a frictional synchronizing connection between said shaft and a part to be synchronized therewith, a jaw clutch sleeve encircling and drivingly connected to said hub and shiftable axially for establishing a positive drive connection between said shaft and said part, and a thrust bar interposed between said sleeve and said hub in a position parallel to said shaft, said bar being in axial thrust receiving association with the interior of said sleeve and having an end axially overlapping and radially outwardly of said collar portion and engageable with said radially projecting portion so as to transmit to said ring the thrust received from said sleeve.

17. In a synchronizing transmission, a shaft, a hub axially fixed thereon, a synchronizer element drivingly associated with said hub and adapted under axial pressure to establish a frictional synchronizing connection between said shaft and a part to be synchronized therewith, a jaw clutch sleeve encircling and having internal teeth splined upon said hub and shiftable axially for establishing a positive drive connection between said shaft and said part, and a substantially rigid thrust bar interposed between said sleeve and said hub in a position parallel to said shaft and radially outwardly of the outline of the friction surface of said synchronizer element, said bar being in axial thrust receiving association with the interior of said sleeve and said synchronizer element having a radially outwardly extending part against which an end of said bar is adapted to abut so as to transmit such thrust to said synchronizer element.

18. In a synchronizing transmission, a shaft, a hub axially fixed thereon, a synchronizer element adapted under axial pressure to establish a frictional synchronizing connection between said shaft and a part to be synchronized therewith, a jaw clutch sleeve encircling and having internal teeth splined upon said hub and shiftable axially for establishing a positive drive connection between said shaft and said part, and a substantially rigid thrust bar interposed between said sleeve and said hub in a position parallel to said shaft and radially outwardly of the outline of the friction surface of said synchronizer element, said bar being in axial thrust receiving association with the interior of said sleeve and in axial thrust transmitting association with said synchronizer element.

19. In a synchronizing transmission, a shaft, a hub axially fixed thereon, a synchronizer ring having a collar portion axially recessed into said hub, said ring being adapted, under axial pressure, to establish a frictional synchronizing connection between said shaft and a part to be synchronized therewith, a jaw clutch sleeve encircling said hub and having internal teeth splined upon the periphery thereof, and shiftable axially for establishing a positive drive connection between said hub and said part, and a thrust bar interposed between said sleeve and said hub in a position parallel to said shaft, and radially outwardly of the friction surface of said synchronizer element, said bar being in axial thrust receiving association with the interior of said sleeve and in axial thrust transmitting association with said synchronizer element.

20. In a synchronizing transmission, a torque transmitting member, a synchronizer element drivingly associated therewith and adapted under axial pressure to establish a frictional synchronizing connection between said member and a part to be synchronized therewith, an annular positive drive element drivingly connected to said member and shiftable axially for establishing a positive drive connection between said member and said part, and means including a low inertia thrust bar operatively interposed between said positive drive elements and said synchronizer element in a position parallel to the axis of said torque transmitting member and radially outwardly of the outline of the friction surface of said synchronizer element, for transmitting thrust from said movable clutch element to said synchronizer element.

21. A transmission synchronizer as defined in claim 20, wherein said thrust bar is formed in an intermediate region with an integral projection, engageable in a complementary recess in the interior of said positive drive element so as to receive thrust therefrom.

22. A transmission synchronizer as defined in claim 1, wherein said last means comprises integral projections on said bars, engageable in complementary recesses in the interior of said sleeve.

23. In a transmission synchronizer, a pair of shafts to be synchronized, friction and jaw clutch elements, drivingly associated with one of said shafts, a hub axially fixed on the other shaft, a synchronizer element adapted under axial pressure to establish a frictional synchronizing connection between said shafts by engagement with said friction clutch element, a jaw clutch sleeve encircling and having internal teeth splined upon said hub and shiftable axially for establishing a positive drive connection between said member and said part through said teeth, a substantially rigid thrust bar disposed between said sleeve and said one member, parallel to the axis of rotation thereof, rotatable with and axially slidable relative to said one member, and adapted to transmit axial thrust to said synchronizer element, spring means urging said thrust bar radially outwardly toward the inner surface of said sleeve, and means providing a break away connection between said thrust bar and said sleeve adapted to resist disengagement in an amount determinable by the force exerted upon the thrust bar by said spring means.

24. In a transmission synchronizer, a pair of shafts to be synchronized, friction and jaw clutch elements, drivingly associated with one of said shafts, a hub axially fixed on the other shaft, a synchronizer element drivingly associated with said hub and adapted under axial pressure to establish a frictional synchronizing connection between said shafts by engagement with said friction clutch element, a jaw clutch sleeve encircling said hub and having internal teeth in splined engagement therewith, a substantially rigid thrust bar disposed between said sleeve and said hub, parallel to the axis of rotation thereof, rotatable with and axially slidable relative to said hub, and adapted to transmit axial thrust to said synchronizer element, spring means urging said thrust bar radially outwardly, and means for transmitting axial thrust from said sleeve to said bar, comprising a radially outwardly extending integral projection on said bar, engageable in a complementary recess in the inner surface of such sleeve and adapted to resist disengagement from said recess in an amount determinable by the force exerted upon the thrust bar by said spring means.

25. In a synchronizing transmission, a torque transmitting member, a synchronizer element adapted under axial pressure to establish a frictional synchronizing connection between said member and a part to be synchronized therewith, an annular positive drive element drivingly connected to said member and shiftable axially for establishing a positive drive connection between said member and said part, a substantially rigid thrust bar, interposed between said positive drive element and said member and arranged to transmit axial thrust to said synchronizer element, spring means urging said thrust bar radially outwardly toward the inner surface of said sleeve, and means for transmitting axial thrust from said sleeve to said bar, comprising a radially outwardly extending integral projection on said bar, engageable in a complementary recess in the inner surface of said sleeve and adapted to resist disengagement from said recess in an amount determinable by the force exerted upon said bar by said spring means.

26. A transmission synchronizer as defined in claim 16, wherein said thrust bar is provided intermediate its ends with a projection engageable in a complementary recess in the interior of said sleeve and wherein there is provided resilient means interposed between said thrust bar and said hub and yieldably urging said thrust bar radially outwardly so as to provide, in the engagement of said projection in said recess, a break away connection between said thrust bar and said movable clutch element.

27. In a transmission synchronizer, an axially fixed driven torque transmitting member, a pair of driving members arranged on the opposite sides of and coaxial with said driven member, each of said driving members including a jaw clutch element and a friction clutch element, a jaw clutch sleeve encircling, drivingly connected to, and axially slidable on said driven member into positive clutching engagement with either of said jaw clutch elements, a pair of synchronizer rings each adapted under axial pressure to establish frictional synchronizing engagement with their respective friction clutch elements, a thrust bar disposed between said sleeve and driven member, parallel to the axis of rotation, rotatable with and axially slidable relative to said driven member, formed in its intermediate region with an integral projection in thrust receiving engagement in a complementary recess in the interior of said jaw clutch sleeve and with its ends disposed in axially overlapping association with portions of said synchronizer rings, radially beyond the outline of the friction clutch surfaces and in axial thrust transmitting association with the synchronizer rings, and spring means urging said thrust bar radially outwardly so as to maintain said thrust receiving association.

28. In a synchronizing transmission, a pair of axially aligned torque transmitting members, a movable jaw clutch element drivingly associated with one of said members, and adapted to be moved into engagement with a jaw clutch element drivingly associated with the other member, thus to establish a positive drive connection between said members, a synchronizer element drivingly associated with said one member and axially movable into frictional driving engagement with a friction clutch element drivingly associated with said other member, and means for transmitting axial thrust from said movable clutch element to said synchronizer element so as to establish such frictional driving engagement, said last means including a relatively thin, flat thrust bar disposed in a plane parallel to the axis of said members and normal to a radius thereof, said bar having at an end a radially inwardly projecting finger adapted to establish abutting engagement with said synchronizer element for transmitting thrust thereto.

29. In a synchronizing transmission, a pair of aligned torque transmitting members, a movable jaw clutch element drivingly associated with one of said members and axially movable into engagement with a jaw clutch element drivingly associated with the other member, thus to establish a positive drive connection between said members, a synchronizer element adapted under axial pressure to establish frictional synchronizing engagement with a friction clutch element drivingly associated with said other member, and means for transmitting axial thrust from said movable clutch element to said synchronizer element, said last means including a thrust bar disposed parallel to the axis of said members and having at an end a radially inwardly projecting finger adapted to establish abutting engagement with said synchronizer element for transmitting thrust thereto.

30. In a synchronizing transmission, a pair of axially aligned torque transmitting members, a hub mounted on one of said members and having peripheral teeth, a movable jaw clutch sleeve having internal teeth meshing with said hub teeth and axially movable relative thereto into engagement with jaw clutch teeth carried by the other member, thus to establish a positive drive connection between said members, a synchronizer ring partially disposed inside of said jaw clutch sleeve, said synchronizer ring being adapted under axial pressure to establish frictional synchronizing engagement with said other member, and means for transmitting axial thrust from said clutch sleeve to said synchronizer element, said last means including a thrust bar interposed radially between said jaw clutch sleeve and said hub, parallel to the axis of said members and having at an end a radially inwardly projecting finger in abutting engagement with said synchronizer ring for transmitting thrust thereto.

31. A synchronizing transmission as defined in claim 30 wherein said thrust bar is formed in an intermediate region with an integral projection engageable in a complementary recess in the interior of said sleeve for receiving thrust therefrom.

SAMUEL O. WHITE.